US011033840B2

(12) United States Patent
Hennen (10) Patent No.: US 11,033,840 B2
(45) Date of Patent: Jun. 15, 2021

(54) PART SEPARATOR CLEANING APPARATUS (71) Applicant: U.M.C., Inc., Monticello, MN (US)

(72) Inventor: Anthony Scott Hennen, Maple Lake, MN (US)

(73) Assignee: U.M.C., Inc., Monticello, MN (US)

(*) Notice: Subject to any disclaimer, the term of this patent is extended or adjusted under 35 U.S.C. 154(b) by 210 days.

(21) Appl. No.: 16/214,789

(22) Filed: Dec. 10, 2018

(65) Prior Publication Data

US 2019/0176062 A1 Jun. 13, 2019

Related U.S. Application Data (60) Provisional application No. 62/597,056, filed on Dec. 11, 2017.

(51) Int. Cl.
*D06F 39/00* (2020.01)
*B01D 33/00* (2006.01)
*B01D 33/15* (2006.01)
*B01D 35/18* (2006.01)
*B01D 33/80* (2006.01)
*B01D 46/00* (2006.01)

(52) U.S. Cl.
CPC ......... *B01D 33/0041* (2013.01); *B01D 33/15* (2013.01); *B01D 33/801* (2013.01); *B01D 35/18* (2013.01); *B01D 46/0031* (2013.01); *D06F 39/00* (2013.01)

(58) Field of Classification Search
None
See application file for complete search history.

(56) References Cited

U.S. PATENT DOCUMENTS

| 1,375,371 A | 4/1921 | Fleischer |
| 2,873,020 A | 2/1959 | Kay |
| 3,360,104 A | 12/1967 | Sutcliffe |
| 4,131,192 A | 12/1978 | Cipolla |

(Continued)

FOREIGN PATENT DOCUMENTS

| CN | 104386429 | 3/2015 |
| DE | 202005019112 | 5/2006 |

(Continued)

*Primary Examiner* — Michael E Barr
*Assistant Examiner* — Jason P Riggleman
(74) *Attorney, Agent, or Firm* — Pauly, DeVries Smith & Deffner LLC (57) ABSTRACT

Embodiments herein relate to part separation and cleaning devices. In an embodiment, a part separation and cleaning apparatus is included having a liquid holding tub defining an interior volume. The liquid holding tub can include a bottom pan defining a center aperture and an outer perimeter, a perimeter wall attached to the bottom pan adjacent to the outer perimeter thereof and a center sleeve attached to the bottom pan over the central aperture and extending upward away from the bottom pan. The apparatus can further include a motor and a drive shaft. An indexing plate within the liquid holding tub can be connected to the drive shaft. The indexing plate can rotate and can include a plurality of discrete compartments. A control circuit can be configured to cause the drive unit to initiate an indexing movement in response to a received signal. Other embodiments are also included herein.

27 Claims, 8 Drawing Sheets

(56) References Cited

U.S. PATENT DOCUMENTS

| | | | |
|---|---|---|---|
| 4,237,912 A * | 12/1980 | Hill | A61L 2/04 |
| | | | 134/112 |
| 4,429,780 A | 2/1984 | Innes | |
| 4,664,575 A | 5/1987 | Ohmura et al. | |
| 4,989,718 A | 2/1991 | Steeber | |
| 5,074,397 A | 12/1991 | Mukai et al. | |
| 5,255,773 A | 10/1993 | Pollock | |
| 5,304,027 A | 4/1994 | La Barre et al. | |
| 5,304,110 A | 4/1994 | Obrist | |
| 5,372,236 A | 12/1994 | Layer | |
| 5,400,894 A | 3/1995 | Smith | |
| 5,443,358 A | 8/1995 | Yanniello | |
| 5,971,162 A | 10/1999 | Allagnat et al. | |
| 6,261,045 B1 | 7/2001 | Mcfall | |
| 7,757,837 B2 | 7/2010 | Jones | |
| 7,798,305 B2 | 9/2010 | Camelli | |
| 9,095,940 B2 | 8/2015 | Zakotnik et al. | |
| 9,156,118 B2 | 10/2015 | Horn | |
| 2007/0039415 A1 | 2/2007 | Weiss | |
| 2016/0229013 A1 | 8/2016 | Komine et al. | |

FOREIGN PATENT DOCUMENTS

| | | | |
|---|---|---|---|
| DE | 102007036270 | | 2/2009 |
| DE | 202015008763 | | 3/2016 |
| EP | 0540905 | | 5/1993 |
| EP | 2840046 | | 2/2015 |
| GB | 1431031 | | 4/1976 |
| GB | 2024362 A * | | 1/1980 |
| GB | 2026417 | | 8/1982 |
| KR | 20080032736 | | 4/2008 |
| WO | 2015004546 | | 1/2015 |

\* cited by examiner

PART SEPARATOR CLEANING APPARATUS

This application claims the benefit of U.S. Provisional Application No. 62/597,056, filed Dec. 11, 2017, the content of which is herein incorporated by reference in its entirety.

FIELD

Embodiments herein relate to part separation and cleaning devices.

BACKGROUND

High-quality machined parts can be produced by various machine tools including CNC machine devices. In some cases, after setup the machining device can operate and produce parts without direct human control. In such cases, the machining device may operate continuously and output finished part at regular time intervals. The newly fabricated parts need to be collected from the machining device that creates them.

SUMMARY

Embodiments herein relate to part separation and cleaning devices. In a first aspect, a part separation and cleaning apparatus is included having a liquid holding tub defining an interior volume comprising a bottom pan defining a center aperture and an outer perimeter. A perimeter wall can be attached to the bottom pan adjacent to the outer perimeter thereof. A center sleeve can be attached to the bottom pan over the central aperture and extend upward away from the bottom pan. A drive mechanism can be included having a motor and a drive shaft operably connected to the motor. The drive shaft can pass up through the center sleeve. An indexing plate can be disposed within the liquid holding tub, the indexing plate in mechanical communication with the drive shaft. The indexing plate can be configured to rotate within the liquid holding tub. The indexing plate can include a plurality of discrete compartments. A controller circuit can be in electrical communication with the drive mechanism and the part sensor. The controller unit can be configured to cause the drive unit to initiate an indexing movement in response to a received signal.

In a second aspect, in addition to one or more of the preceding or following aspects, or in the alternative to some aspects, a part sensor can be included that can be configured to detect the presence of a part and send a signal to the controller circuit to initiate an indexing movement.

In a third aspect, in addition to one or more of the preceding or following aspects, or in the alternative to some aspects, a rotatable drive hat can have an upper inner portion configured to engage with the drive shaft and a lower outer perimeter portion configured to engage with the indexing plate. The indexing plate can be suspended within the liquid holding tub by the rotatable drive hat.

In a fourth aspect, in addition to one or more of the preceding or following aspects, or in the alternative to some aspects, the lower outer portion of the rotatable drive hat can include a seating flange. The seating flange can be configured to contact a bottom portion of the indexing plate when the rotatable drive hat engages the indexing plate.

In a fifth aspect, in addition to one or more of the preceding or following aspects, or in the alternative to some aspects, the liquid holding tub further can include a drain port disposed on the bottom pan or on a lower portion of the perimeter wall.

In a sixth aspect, in addition to one or more of the preceding or following aspects, or in the alternative to some aspects, a liquid pump can be included in liquid communication with the liquid holding tub.

In a seventh aspect, in addition to one or more of the preceding or following aspects, or in the alternative to some aspects, a liquid pump can cause movement of a liquid disposed within the liquid holding tub.

In an eighth aspect, in addition to one or more of the preceding or following aspects, or in the alternative to some aspects, a liquid maintenance unit can be included defining a liquid flow path drawing liquid in from the liquid holding tub and returning liquid to the liquid holding tub.

In a ninth aspect, in addition to one or more of the preceding or following aspects, or in the alternative to some aspects, a liquid filter can be included and can be disposed along a liquid flow path.

In a tenth aspect, in addition to one or more of the preceding or following aspects, or in the alternative to some aspects, a heating unit can be included and can be configured to heat a liquid within the liquid holding tub.

In an eleventh aspect, in addition to one or more of the preceding or following aspects, or in the alternative to some aspects, the center sleeve can be a tube.

In a twelfth aspect, in addition to one or more of the preceding or following aspects, or in the alternative to some aspects, the part sensor can include a sensor selected from the group consisting of an ultrasonic sensor, a magnetic sensor, a weight sensor, an optical sensor, a laser sensor, and an electromagnetic wave sensor.

In a thirteenth aspect, in addition to one or more of the preceding or following aspects, or in the alternative to some aspects, a part receiving unit can include a reception platform.

In a fourteenth aspect, in addition to one or more of the preceding or following aspects, or in the alternative to some aspects, the reception platform can include a downward sloping ramp.

In a fifteenth aspect, in addition to one or more of the preceding or following aspects, or in the alternative to some aspects, the part reception platform can include one or more inlet guides.

In a sixteenth aspect, in addition to one or more of the preceding or following aspects, or in the alternative to some aspects, the indexing movement can include rotation of a magnitude equal to 360 degrees divided by the number of discrete compartments on the indexing plate.

In a seventeenth aspect, in addition to one or more of the preceding or following aspects, or in the alternative to some aspects, the indexing movement can include a bidirectional movement.

In an eighteenth aspect, in addition to one or more of the preceding or following aspects, or in the alternative to some aspects, the indexing movement can include a first movement in a first rotational direction, following by a second movement in a second rotational direction, wherein the second rotational direction is opposite the first rotational direction.

In a nineteenth aspect, in addition to one or more of the preceding or following aspects, or in the alternative to some aspects, the discrete compartments can include opposed side walls and a bottom wall, wherein the opposed side walls comprise one or more apertures to allow a liquid to flow through from one discrete compartment to the next.

In a twentieth aspect, in addition to one or more of the preceding or following aspects, or in the alternative to some aspects, the discrete compartments can include opposed side walls and a bottom wall, the indexing plate further comprising one or more liquid vectoring fins disposed at a perimeter edge of one or side walls.

In a twenty-first aspect, in addition to one or more of the preceding or following aspects, or in the alternative to some aspects, a machine communication input port can be included that is in electrical communication with the controller circuit to receive a signal from a separate machining device.

In a twenty-second aspect, in addition to one or more of the preceding or following aspects, or in the alternative to some aspects, the controller circuit can include at least one component selected from the group consisting of a processor, microprocessor, programmable logic controller (PLC), a microcontroller, and an application specific integrated circuit.

In a twenty-third aspect, in addition to one or more of the preceding or following aspects, or in the alternative to some aspects, the controller circuit can track a total number of parts received.

In a twenty-fourth aspect, in addition to one or more of the preceding or following aspects, or in the alternative to some aspects, a human-machine interface can be included and can be in electrical communication with the controller circuit.

In a twenty-fifth aspect, in addition to one or more of the preceding or following aspects, or in the alternative to some aspects, the liquid holding tub can be formed of a metal such as stainless steel or a polymeric material.

In a twenty-sixth aspect, in addition to one or more of the preceding or following aspects, or in the alternative to some aspects, the indexing plate can be formed of a polymeric material.

In a twenty-seventh aspect, in addition to one or more of the preceding or following aspects, or in the alternative to some aspects, the indexing plate can include at least one material selected from the group consisting of a polyamide, a polyvinyl chloride, a polycarbonate, and a polyolefin.

In a twenty-eighth aspect, in addition to one or more of the preceding or following aspects, or in the alternative to some aspects, further comprising part collector inserts disposed within the discrete compartments, the part collector inserts including a material having a softer durometer value than a durometer value for a material forming the indexing plate.

In a twenty-ninth aspect, in addition to one or more of the preceding or following aspects, or in the alternative to some aspects, one or more ultrasonic transducers can be included and can be mounted to an underside of the liquid holding tub.

In a thirtieth aspect, in addition to one or more of the preceding or following aspects, or in the alternative to some aspects, the bottom pan of the liquid holding tub can be substantially flat.

In a thirty-first aspect, in addition to one or more of the preceding or following aspects, or in the alternative to some aspects, the bottom pan of the liquid holding tub can include a conical portion facing downward.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

As referenced above, high-quality machined parts can be produced by various machine tools including CNC machine devices. In some cases, after setup the machining device can operate and produce parts without direct human control. In such cases, the machining device may operate continuously and output finished part at regular time intervals. The newly fabricated parts need to be collected from the machining device that creates them.

More specifically, newly fabricated parts need to be collected and handled in such a way that damage is not done to the parts. For example, if parts were simply collected by allowing them to fall into a large basket, it is possible that damage would be done as finished parts were dropped in through impact with other parts already in the basket. As such, in some cases it can be desirable to collect parts in a device that allows for each part to have its own compartment to prevent damage from occurring to the parts through contact with each other.

In addition, various compositions such as lubricants or other processing fluids can be applied to parts as they are machined. These compositions typically need to be washed off the parts. However, the task of washing can be more difficult if the compositions are allowed to dry onto the parts.

Embodiments herein can collect parts and separate them into discrete compartments such that damage is not done to the parts as they are collected. In addition, embodiments herein can serve to wash the parts as they are collected, preventing more difficult and time-consuming washing steps from being required downstream.

Figure 1:
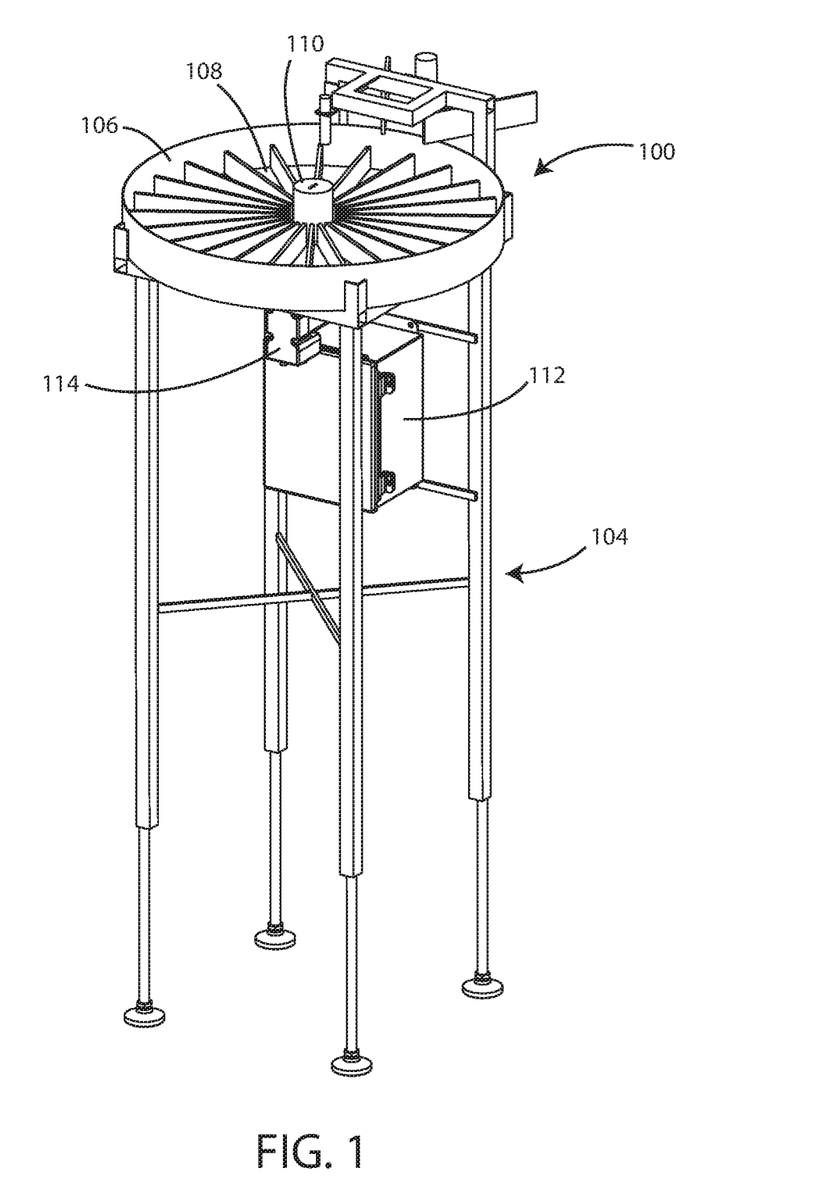
FIG. 1 is a schematic view of a part separation and cleaning apparatus in accordance with various embodiments herein.

Referring now to FIG. 1, a schematic view is shown of a part separation and cleaning apparatus 100 in accordance with various embodiments herein. The part separation and cleaning apparatus 100 can include a liquid holding tub 106 defining an interior volume and a support frame 104. An indexing plate 108 can be disposed within, or otherwise suspended within, the liquid holding tub 106. A drive hub or drive hat 110 can interface with the indexing plate 108 in order to provide for motive force to rotate the indexing plate 108 within the liquid holding tub 106. The drive hat 110 can be in mechanical communication (direct or indirect) with a motor 114. The apparatus 100 can be controlled by components housed within a control housing 112.

The liquid holding tub 106 can be formed of various materials including metals (such as stainless steel), polymers, composites, and the like. The size of the interior volume defined by the liquid holding tub 106 can also vary. In some embodiments, the size of the interior volume can be about 5, 10, 15, 20, 25, 30, 40, 50, 75, 100 or more liters. In some embodiments, the size of the interior volume can fall within a range wherein any of the preceding numbers can serve as the upper or lower bound of the range, provided that the upper bound is greater than the lower bound. In some embodiments, the liquid holding tub 106 can be circular. However, it can also take on various other shapes such as polygonal, square, etc.

The indexing plate 108 can be formed of various materials including metals, polymers, composites, or the like. In some embodiments, the indexing plate 108 can be formed of a coated (such as a polymer coated) metal. In some embodiments, wherein the indexing plate 108 includes a polymer either as a coating or as the substrate itself, the polymer can include one or more of a polyamide, a polyvinyl chloride, a polycarbonate, and a polyolefin. In some embodiments, the indexing plate 108 can be circular. However, it can also take on various other shapes such as polygonal, square, etc.

Figure 2:
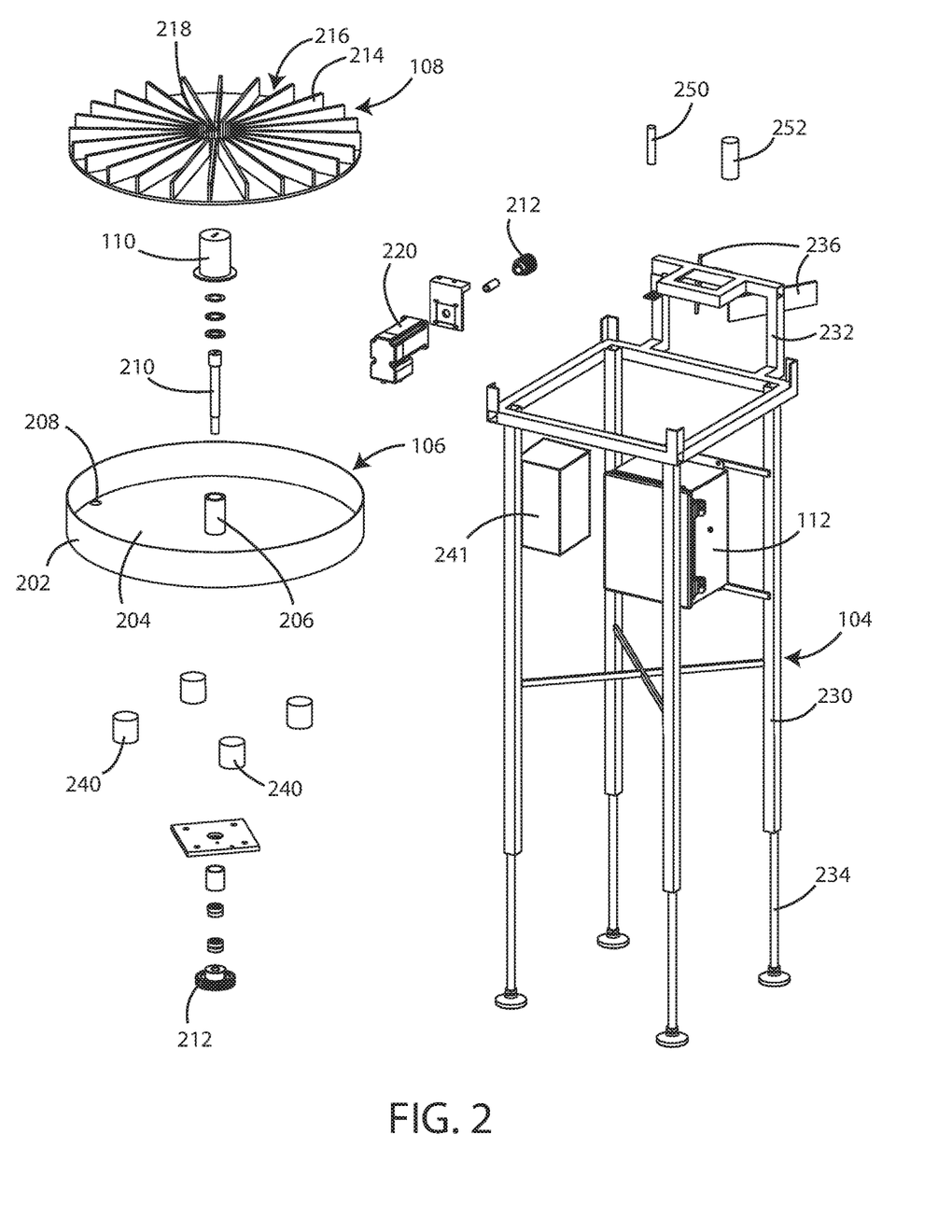
FIG. 2 is an exploded view of a part separation and cleaning apparatus in accordance with various embodiments herein.

Referring now to FIG. 2, an exploded view of a part separation and cleaning apparatus 100 is shown in accordance with various embodiments herein. The liquid holding tub 106 can include a perimeter wall 202 attached to the bottom pan 204 adjacent to the outer perimeter thereof. In some embodiments, the perimeter wall 202 can be about 4, 6, 8, 10, 15, 20, 30, or 40 centimeters tall, or can have a height within a range between any of these.

A center sleeve 206 can be attached to the bottom pan 204 over a central aperture (not shown in this view) and extending upward away from the bottom pan 204. In some embodiments, the center sleeve 206 can be the same height as the perimeter wall 202. However, in other embodiments, the center sleeve 206 can be taller or shorter than the perimeter wall 202. In some embodiments, the center sleeve can be a tube. In some embodiments, the center sleeve can have a circular cross-section. However, in other embodiments the cross-section can be square, polygonal, ovoid, etc.

In some embodiments, a drain port 208 can be disposed within the bottom pan 204. In some embodiments, the bottom pan 204 is substantially flat. In other embodiments, the bottom pan 204 is includes a conical portion facing downward. In some embodiments, the drain port 208 is positioned to be at the lowest portion of the bottom pan 204. For example, in the context of the bottom pan 204 including a conical portion facing downward, the drain port 208 can be positioned at or near the bottom of the conical portion. A drain plug can fit within the drain port 208 to seal it. The drain plug can be a screw-in type, a compression fit type, or the like.

The center sleeve 206 can serve as a passage for a drive shaft 210. The drive shaft 210 can be connected (directly or indirectly) to the drive hat 110. The drive hat 110 can be rotatable and can have an upper inner portion configured to engage with the drive shaft 210 and a lower outer perimeter portion configured to engage with the indexing plate 108 (lower outer perimeter portion shown in FIG. 4). Continuing with reference to FIG. 2, the indexing plate 108 can be suspended within the liquid holding tub 106 by the rotatable drive hat 110. In some embodiments, there can be a small gap between the bottom of the indexing plate 108 and the bottom pan 204 of the liquid holding tub 106. The gap can be about 0.1, 0.5, 1, 2, 3, 5, 8, 10, 15, 20, 30, 40 or more millimeters, or can be within a range between any of these.

The indexing plate 108 can include a central aperture 218 that can engage with the rotatable drive hat 110. The indexing plate 108 can also define a plurality of discrete compartments 216 that can be separated from one another by side walls 214. The indexing plate 108 can be configured to rotate within the liquid holding tub 106.

A motor 220 can be in mechanical communication with the drive shaft 210 through one or more gears 212. It will be appreciated that many different types of motors can be used. In some embodiments, the motor 220 is an electric motor. In some embodiments, the motor 220 is an electronically commutated motor. In some embodiments, the motor 220 is a stepper motor.

The frame 104 can include an upper frame portion 232 and a lower frame portion 230. The frame 104 can be formed of various materials including, for example, metals. The frame 104 can take on various shapes and portions thereof can be of various cross-sections including, but not limited to, square, rectangular, polygonal, round, oval and the like. In some embodiments, adjustable legs 234 can interface with the lower frame portion 230 to allow for adjusting the overall height of the part separation and cleaning apparatus 100. In some embodiments, the adjustable legs 234 can telescope in and out of the lower frame portion 230. In some embodiments, the adjustable legs 234 can be held in place with respect to the lower frame portion 230 using a set screw, bolts, lever, cam lever, pins and apertures, or the like.

In some embodiments, an ultrasonic generator 241 and one or more ultrasonic transducers 240 can be included. In some embodiments, the ultrasonic transducers 240 can be mounted in contact with liquid holding tub 106 either on the inside or on the outside. The ultrasonic transducers 240 can be configured to transmit ultrasonic energy into a liquid within the liquid holding tub 106. In some embodiments, the ultrasonic transducers 240 can be mounted underneath the bottom pan 204 and can generate ultrasonic vibrational energy that can move through a fluid in the liquid holding tub 106 in order to enhance cleaning action upon parts being carried by the indexing plate 108.

In some embodiments, the part separation and cleaning apparatus 100 can include one or more sensors 250, 252. The sensors can be configured to sense various aspects related to the operation of the apparatus, including but not limited to, the presence of a part at a particular location and/or the position of the indexing plate 108. In some embodiments, one or more of the sensors 250, 252 can be selected from the group consisting of an ultrasonic sensor, a magnetic sensor, a weight sensor, an optical sensor, a laser sensor, and an electromagnetic wave sensor.

In some embodiments, the part separation and cleaning apparatus 100 can include one or more inlet guides 236. The inlet guides 236 can act to direct parts to particular compartments 216 that are aligned for part reception (before rotating away to allow another compartment 216 to receive a part).

Figure 3:
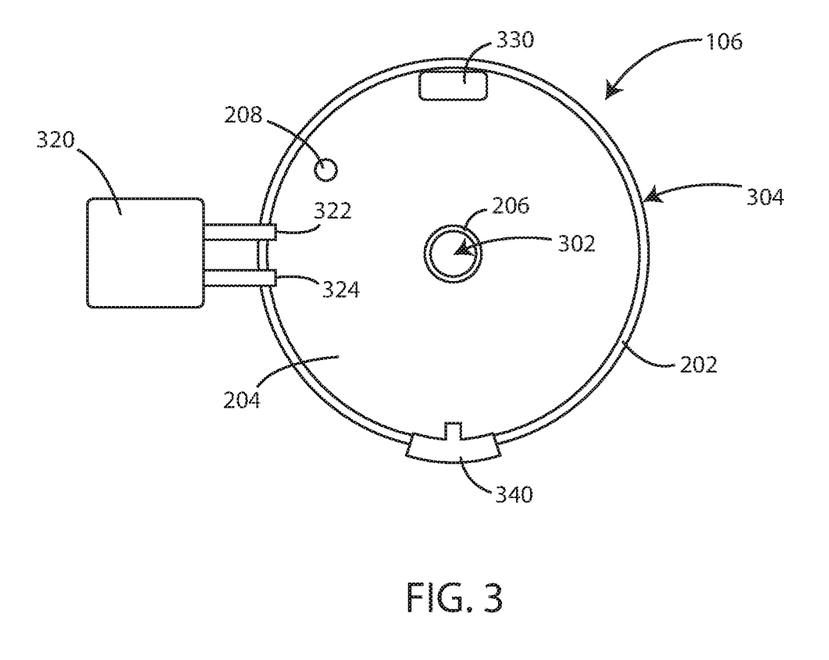
FIG. 3 is a schematic top view of a liquid holding tub in accordance with various embodiments herein.

Referring now to FIG. 3, a schematic top view of a liquid holding tub 106 is shown in accordance with various embodiments herein. The liquid holding tub 106 can include a bottom pan 204 defining a center aperture 302 and an outer perimeter 304. The liquid holding tub 106 can have a diameter of about 10, 20, 30, 40, 50, 60, 70, 80, 90, 100, 120, 140, or 160 centimeters, or can have a diameter falling within a range between any of the preceding. A perimeter wall 202 is attached to the bottom pan 204 adjacent to the outer perimeter 304. A center sleeve 206 is attached to the bottom pan 204 over the central aperture and extends upward away from the bottom pan 204. The center sleeve 206 can be attached to the bottom pan 204 in such a way (welded, bonded, integrally-formed, etc.) that water or another liquid that might be in the liquid holding tub 106 does not leak out of the liquid holding tub 106 through the center aperture 302.

In some embodiments, a liquid pump 330 can be included and can be in liquid communication with the liquid holding tub 106. The liquid pump 330 can be effective to cause movement of a liquid disposed with the liquid holding tub 106.

In some embodiments, a liquid maintenance unit 320 can be included. The liquid maintenance unit 320 can define a liquid flow path drawing liquid in from the liquid holding tub 106 through an input port 322 and returning liquid to the liquid holding tub 106 through an output port 324. Various operations can be performed by the liquid maintenance unit 320 in order to maintain the condition of the liquid in the liquid holding tub 106 as desired. In some embodiments, the liquid maintenance unit 320 can include a liquid filter disposed along the liquid flow path. The liquid filter can remove particulates from the liquid that passes therethrough. In some embodiments, the liquid maintenance unit 320 can include a fluid reservoir in order to add more liquid to the liquid holding tub 106. In some embodiments, the liquid maintenance unit 320 can include a fluid control valve and be connected to an external source of a liquid and can selectively open the fluid control valve in order to add additional liquid to the liquid holding tub 106.

In some embodiments, a heating unit 340 can be included and can be configured to heat a liquid within the liquid holding tub 106. In some embodiments, the heating unit 340 can include a thermostat so that a specific target temperature can be set and the heating unit 340 can selectively turn on and turn off in order to maintain the temperature of the liquid within the liquid holding tub 106 at a desired temperature. In some embodiments, the desired temperature can be about 30, 40, 50, 60, 70, 80, 90 or 99 degrees Celsius, or within a range between any of these temperatures.

Figure 4:
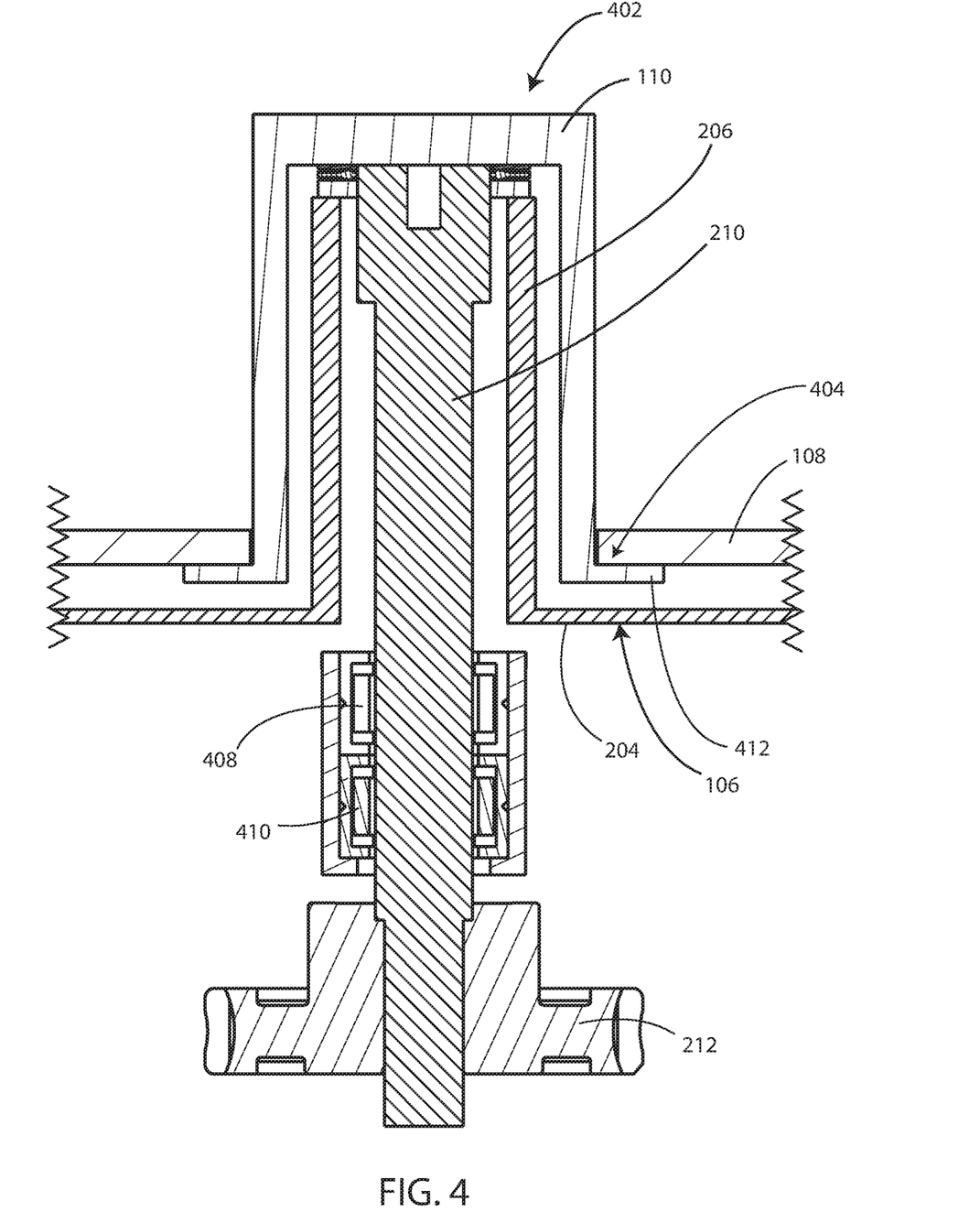
FIG. 4 is a cross-sectional view of a portion of a part separation and cleaning apparatus in accordance with various embodiments herein.

Referring now to FIG. 4, a cross-sectional view of a portion of a part separation and cleaning apparatus 100 is shown in accordance with various embodiments herein. In this view, the drive shaft 210 can be seen passing up through the center sleeve 206. The drive shaft 210 is connected to the drive hat 110. The drive hat 110 is rotatable along with the drive shaft 210 and can have an upper inner portion 402 configured to engage with the drive shaft 210 and a lower outer perimeter portion 404 configured to engage with the indexing plate 108. The drive shaft 210 can be supported by bearings 408, 410. The lower outer perimeter portion 404 of the rotatable drive hat can include a seating flange 412 which can be configured to contact a bottom portion of the indexing plate 108 when the rotatable drive hat 110 engages the indexing plate 108. The indexing plate 108 can be suspended within the liquid holding tub 106 by the rotatable drive hat 110. In some embodiments, there can be a small gap between the bottom of the indexing plate 108 and the bottom pan 204 of the liquid holding tub 106. It will be appreciated, however, that in some embodiments a drive hat may be omitted and the indexing plate 108 can be directly attached to the drive shaft or can be attached to the drive shaft using a device other than a drive hat as shown herein.

Figure 5:
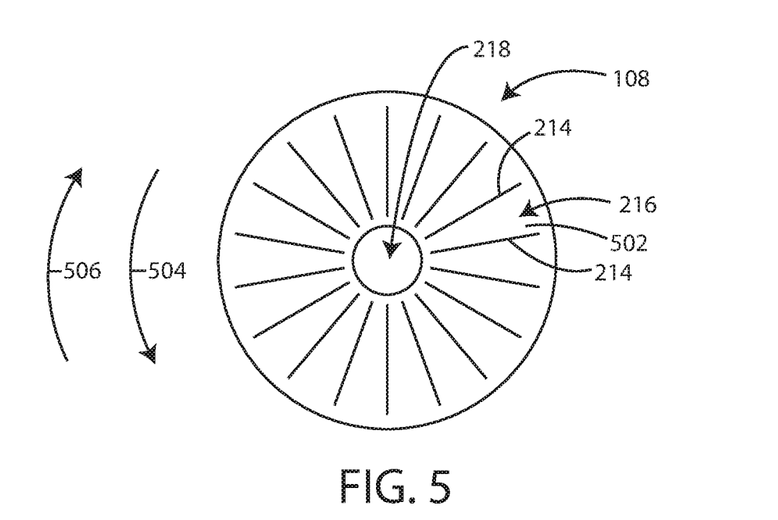
FIG. 5 is schematic top view of an indexing plate in accordance with various embodiments herein.

Referring now to FIG. 5, a schematic top view of an indexing plate 108 is shown in accordance with various embodiments herein. The indexing plate 108 can include a central aperture 218 that can engage with the rotatable drive hat. In some embodiments, a portion of the rotatable drive hat can pass through the central aperture 218. The indexing plate 108 can also define a plurality of discrete compartments 216 that can be separated from one another by side walls 214. As such, the compartments 216 can be defined by side walls 214 and a bottom wall 502. The indexing plate 108 can be configured to rotate within the liquid holding tub 106. In some embodiments, the indexing plate 108 can be configured to rotate bidirectionally within the liquid holding tub 106.

In some embodiments, the movement of the indexing plate 108 can be an indexing movement. For example, the indexing plate 108 can rotate until it reaches a defined point and then stop rotating. This can be followed by successive indexing movement where the indexing plate 108 again rotates until it reaches a defined point and then stops rotating. An indexing movement can be triggered (as controlled by control circuit described below) each time a part is sensed that is ready for collection by the part separation and cleaning apparatus 100. Alternatively, an indexing movement can be triggered each time the part separation and cleaning apparatus 100 receives a signal from a separate machining device (such as a CNC machining device) that can be attached to the part separation and cleaning apparatus 100 through a machine communication port.

It will be appreciated that an indexing movement does not have to be all in a single direction of rotation. For example, to enhance turbulence in the liquid within the liquid holding tub 106, the indexing movement can include a first movement in a first rotational direction 504, following by a second movement in a second rotational direction 506, wherein the second rotational direction 506 is opposite the first rotational direction 504. As an even more specific example, the indexing movement could include, for example, counter clockwise rotation of 5 degrees followed by clockwise rotation of 10 degrees, for a net clockwise rotation of 5 degrees (however, the net rotation can also be counter clockwise). The separate clockwise or counter clockwise movements can be about 1, 2, 3, 4, 5, 7.5 10, 15, 20, 25, 30, 40, 50, 60, 90, 120, 180, 270, 360, 540, 720 degrees or more or within a range between any of the preceding.

In some embodiments, the indexing movement can include a net amount of rotation in a particular direction (clockwise or counter clockwise) as measured in degrees that is equal to 360 divided by the number of discrete compartments on the indexing plate.

In some embodiments, the opposed side walls defining the compartments can include one or more apertures to allow a liquid to flow through from one discrete compartment to the next.

While the embodiment of FIG. 5 shows a solid indexing plate, it will be appreciated that in various embodiment there can be many small apertures in the indexing plate (bottom, side walls, etc.) to allow fluid to freely flow there-through.

The indexing plate 108 can be configured so that it can be lifted out from liquid holding tub 106. In some embodiments, handles can be mounted on the indexing plate 108 in order to facilitate lifting it out of the liquid holding tub 106. In some embodiments, the indexing plate 108 can be configured to release from the drive hat 110. In this manner, a machine operator can quickly remove an indexing tray that is filled with parts and/or replace the indexing tray with one that is more appropriate in size or configuration for whatever parts are currently being created. In other embodiments, both the indexing plate 108 and the drive hat 110 can be configured to release from the drive shaft 210. In some embodiments, an optical sensor can be mounted on or adjacent to the liquid holding tub 106 and indicia (such as a bar code or the like) can be placed on the indexing tray. The indicia can include information about the particular indexing tray inserted which can allow the apparatus to determine information about the tray such as the size, number of compartments, etc. In this manner, the apparatus can automatically configure itself to rotate the proper amount based on the presence of a particular indexing tray.

Many variations on the structure of the indexing plate are contemplated herein. In some embodiments, the side walls may not extend all the way to outer perimeter of the indexing plate. In some embodiments, the side walls may not extend all the way to the edge of the central aperture. In addition, the number of compartments in the indexing plate may vary substantially. In various embodiments, the indexing plate can include about 4, 6, 8, 10, 12, 14, 16, 20, 24, 30, 40, 50, 60, 70, 80, 90 or 100 compartments. In some embodiments, the indexing plate can include a number of compartments falling within a range wherein any of the foregoing can serve as the upper or lower bound of the range, provided that the upper bound is greater than the lower bound.

Figure 6:
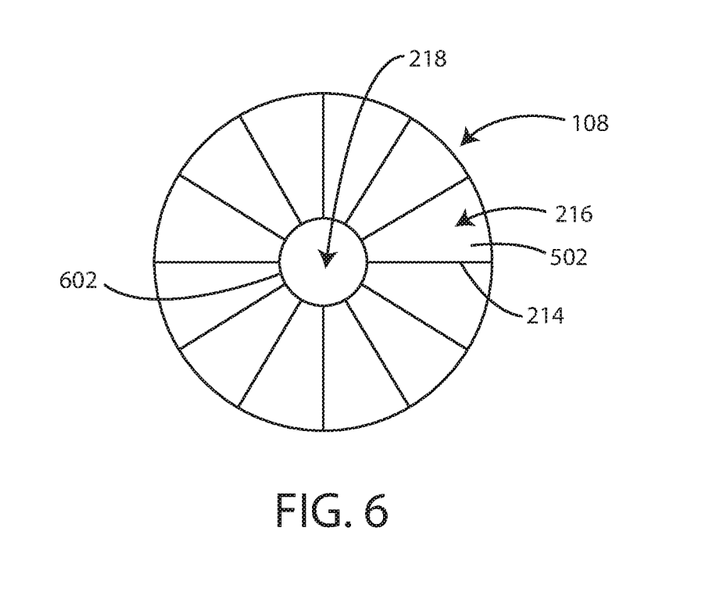
FIG. 6 is schematic top view of an indexing plate in accordance with various embodiments herein.

Referring now to FIG. 6, a schematic top view is shown of an indexing plate 108 in accordance with various embodiments herein. In this embodiment, the indexing plate 108 can include 12 compartments 216 (versus the 18 compartments of the indexing plate 108 shown in FIG. 5). In this embodiment, the side walls 214 extend all the way from the outer perimeter of the indexing plate 108 to the edge of the central aperture 218. An annular wall member 602 can be included at the edges of the central aperture 218 and can serve to further divide the compartments 216 from one another.

Figure 7:
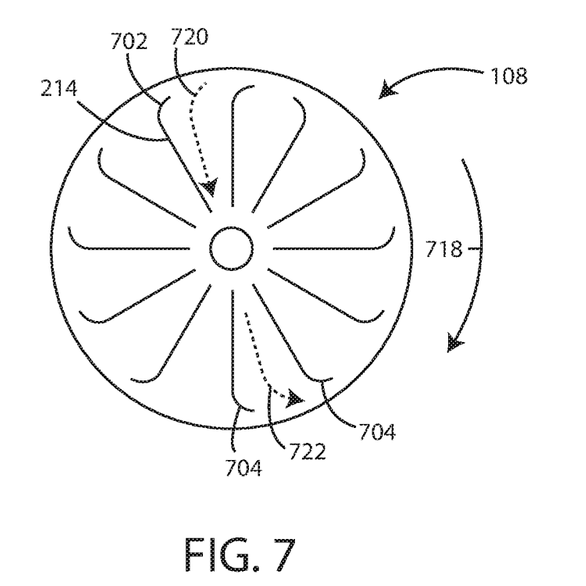
FIG. 7 is schematic top view of an indexing plate in accordance with various embodiments herein.

In some embodiments, vectoring fins can be used to enhance movement of the liquid in the liquid holding tub as the indexing plate rotates. Referring now to FIG. 7, a schematic top view is shown of an indexing plate 108 in accordance with various embodiments herein. The indexing plate 108 can include side walls 214 with vectoring fins 702 attached thereto. In this example, as the indexing plate rotates in the direction of arrow 718, a certain amount of fluid is swept in by vectoring fin 702 and pushed in a direction as indicated by arrow 720. Vectoring fins 704 on the opposite side of the indexing plate 108 can be oriented oppositely so that they allow for a fluid to move outward in the direction of arrow 722 when the indexing plate 108 is rotating in a clockwise direction. However, it will be appreciated that then when the rotation of the indexing plate 108 is counter-clockwise, the flow of the liquid as shown by arrows 720 and 722 can be reversed.

Figure 8:
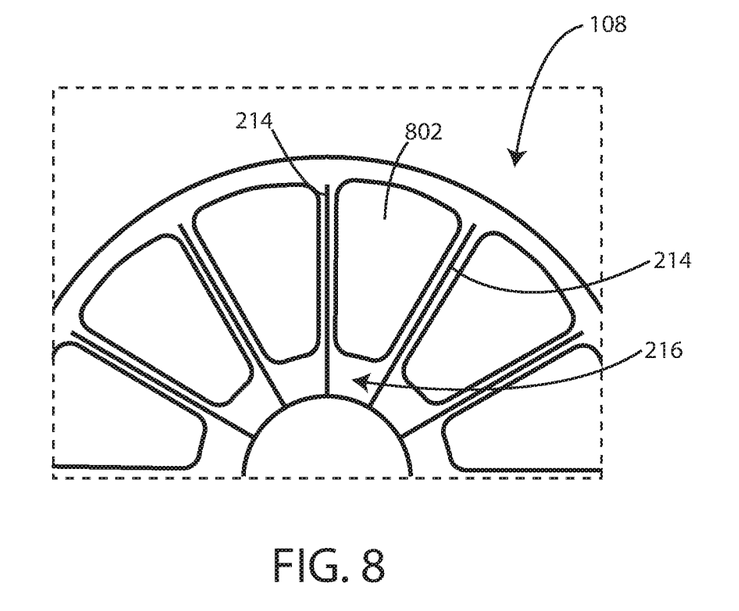
FIG. 8 is schematic top view of a portion of an indexing plate in accordance with various embodiments herein.

In some embodiments, the part separation and cleaning apparatus can further include part collector inserts that fit within the discrete compartments. Referring now to FIG. 8, a schematic top view is shown of a portion of an indexing plate 108 in accordance with various embodiments herein. The part collector inserts 802 can serve to more precisely define a shape in which to receive and hold parts on the indexing plate 108. In various embodiments, the part collector inserts 802 can include a material having a softer durometer value than a durometer value for a material forming the indexing plate 108.

Figure 9:
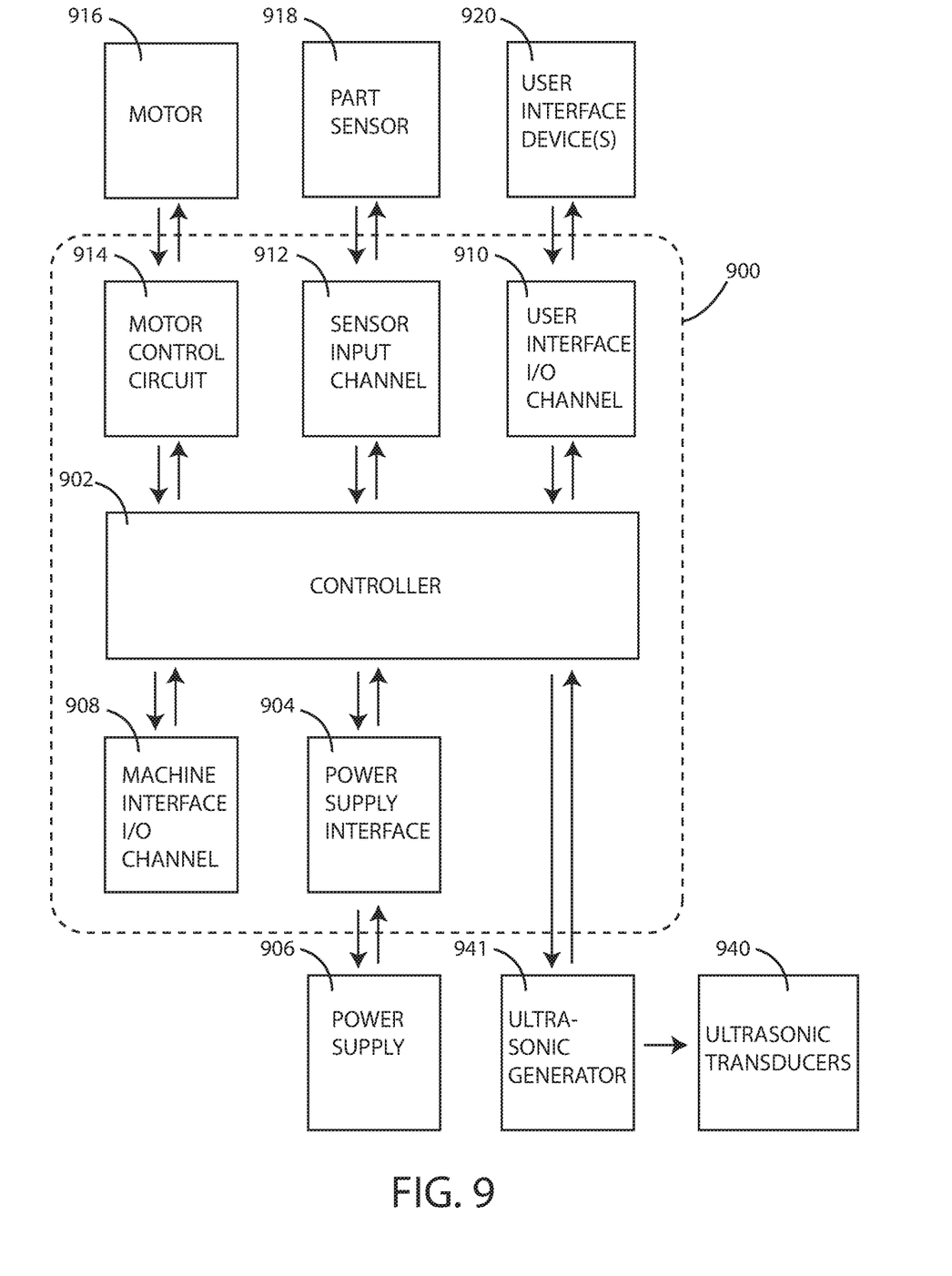
FIG. 9 is schematic view of portions of a part separation and cleaning apparatus in accordance with various embodiments herein.

The part separation and cleaning apparatus can include control circuitry including many different components in order to operate the part separation and cleaning apparatus. Referring now to FIG. 9, a schematic view is shown of portions of a part separation and cleaning apparatus including control circuitry 900 in accordance with various embodiments herein. The control circuitry 900 can include a controller 902 (or processor, microprocessor, microcontroller, programmable logic controller, application-specific integrated circuit, or the like). A power supply interface 904 can serve to convey power from a power supply 906 to the controller 902 and the rest of the power-consuming components of the part separation and cleaning apparatus. A machine interface I/O channel 908 can be included in order to receive a signal from a separate machining device, such as a CNC machining device connected to the part separation and cleaning apparatus through a machine communication port.

A motor control circuit 914 can interface with and be controlled by the controller 902. The motor control circuit 914 can control the motor 916 (which can cause movement of the indexing tray). A sensor input channel 912 can be included which can interface with both the controller 902 and one or more sensors, such as a part sensor 918.

A user interface I/O channel 910 can be included and can interface with both the controller 902 and a user interface device 920, such as a human-machine interface. The human-machine interface can allow for a user to input various settings including, but not limited to, part counting settings, cleaning cycle movement settings, speed, etc.

An ultrasonic generator 941 can be in electrical communication with the controller 902, such that the controller 902 can control operation of the ultrasonic generator 941. One or more ultrasonic transducers 940 can be connected to the ultrasonic generator 941 in order deliver ultrasonic energy to portions of the part separation and cleaning apparatus.

It will be appreciated that the part separation and cleaning apparatus 100 and control circuitry thereof can also include various other components beyond that shown in FIG. 9, such as memory, signal processors/amplifiers, and the like. In addition, in some embodiments, the part separation and cleaning apparatus 100 may include less than all of the components shown in FIG. 9. As such, FIG. 9 is merely provided by way of illustration of one example herein.

The control circuitry 900 can serve to execute many different functions. For example, the control circuitry 900 can be in electrical communication with the drive mechanism and the part sensor and can be configured to cause the drive unit to initiate an indexing movement in response to a received signal from the part sensor. In various embodiments, the control circuitry 900 can store and increment counters for various aspects of operation. For example, the control circuitry can store and increment data that corresponds to the current index position of the indexing tray. The control circuitry can also store and increment data regarding the number of parts currently held by the indexing tray.

Figure 10:
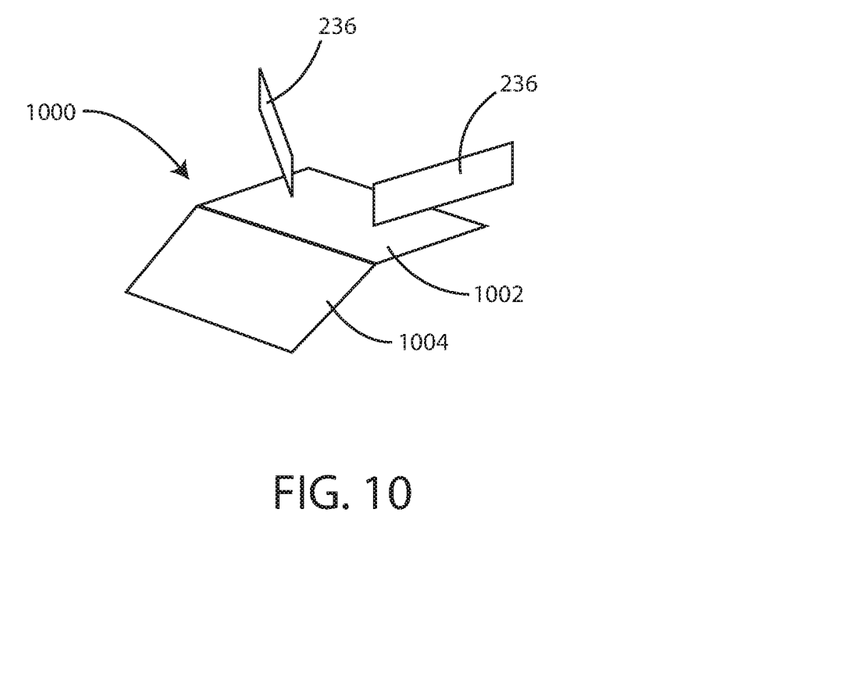
FIG. 10 is a schematic view of a part receiving unit in accordance with various embodiments herein.

Referring now to FIG. 10, a schematic view of a part receiving unit 1000 is shown in accordance with various embodiments herein. The part receiving unit 1000 can include a reception platform 1002. The reception platform 1002 can include a downward sloping ramp 1004. In various embodiments, the part reception platform can further include one or more inlet guides 236. A sensor (not shown in this view) can be mounted so as to detect the presence of a part on the part reception platform. It will be appreciated, however, that in some embodiments, elements shown in FIG. 10 may be a portion of a machine that produces and/or delivers parts to the part separation and cleaning apparatus 100, as opposed to being an integrated portion of the part separation and cleaning apparatus 100 itself.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Aspects have been described with reference to various specific and preferred embodiments and techniques. However, it should be understood that many variations and modifications may be made while remaining within the spirit and scope herein. As such, the embodiments described herein are not intended to be exhaustive or to limit the invention to the precise forms disclosed in the following detailed description. Rather, the embodiments are chosen and described so that others skilled in the art can appreciate and understand the principles and practices.

The claims are:
The invention claimed is:
1. A part separation and cleaning apparatus comprising:
a liquid holding tub defining an interior volume comprising
a bottom pan defining a center aperture and an outer perimeter;
a perimeter wall attached to the bottom pan adjacent to the outer perimeter thereof; and
a center sleeve attached to the bottom pan over the central aperture and extending upward away from the bottom pan;
a drive mechanism comprising
a motor; and
a drive shaft operably connected to the motor, the drive shaft passing up through the center sleeve; and
an indexing plate disposed within the liquid holding tub, the indexing plate in mechanical communication with the drive shaft, the indexing plate configured to rotate within the liquid holding tub, the indexing plate comprising a plurality of discrete compartments;
a part sensor configured to detect the presence of a part and send a signal to a controller circuit to initiate an indexing movement; the controller circuit in electrical communication with the drive mechanism and the part sensor, wherein the controller circuit is configured to cause the drive unit to initiate an indexing movement in response to the signal from the part sensor.

2. The part separation and cleaning apparatus of claim 1, further comprising a rotatable drive hat having an upper inner portion configured to engage with the drive shaft and a lower outer perimeter portion configured to engage with the indexing plate, wherein the indexing plate is suspended within the liquid holding tub by the rotatable drive hat.

3. The part separation and cleaning apparatus of claim 2, the lower outer portion of the rotatable drive hat comprising a seating flange, wherein the seating flange is configured to contact a bottom portion of the indexing plate when the rotatable drive that engages the indexing plate.

4. The part separation and cleaning apparatus of claim 1, the liquid holding tub further comprising a drain port disposed on the bottom pan or on a lower portion of the perimeter wall.

5. The part separation and cleaning apparatus of claim 1, further comprising a liquid pump in liquid communication with the liquid holding tub, the liquid pump causing movement of a liquid disposed within the liquid holding tub.

6. The part separation and cleaning apparatus of claim 1, further comprising
a liquid maintenance unit defining a liquid flow path drawing liquid in from the liquid holding tub and returning liquid to the liquid holding tub; and
a liquid filter disposed along the liquid flow path.

7. The part separation and cleaning apparatus of claim 1, further comprising a heating unit configured to heat a liquid within the liquid holding tub.

8. The part separation and cleaning apparatus of claim 1, the center sleeve comprising a tube.

9. The part separation and cleaning apparatus of claim 1, the part sensor comprising a sensor selected from the group consisting of an ultrasonic sensor, a magnetic sensor, a weight sensor, an optical sensor, a laser sensor, and an electromagnetic wave sensor.

10. The part separation and cleaning apparatus of claim 1, further comprising a part receiving unit including a reception platform.

11. The part separation and cleaning apparatus of claim 10, the reception platform comprising a downward sloping ramp.

12. The part separation and cleaning apparatus of claim 10, the part reception platform further comprising one or more inlet guides.

13. The part separation and cleaning apparatus of claim 1, the indexing movement comprising rotation by a number of degrees equal to 360 divided by the number of discrete compartments on the indexing plate.

14. The part separation and cleaning apparatus of claim 1, the indexing movement comprising a bidirectional movement.

15. The part separation and cleaning apparatus of claim 1, the indexing movement comprising a first movement in a first rotational direction, following by a second movement in a second rotational direction, wherein the second rotational direction is opposite the first rotational direction.

16. The part separation and cleaning apparatus of claim 1, the discrete compartments comprising opposed side walls and a bottom wall, wherein the opposed side walls comprise one or more apertures to allow a liquid to flow through from one discrete compartment to the next.

17. The part separation and cleaning apparatus of claim 1, the discrete compartments comprising opposed side walls and a bottom wall, the indexing plate further comprising one or more liquid vectoring fins disposed at a perimeter edge of one or side walls.

18. The part separation and cleaning apparatus of claim 1, further comprising a machine communication input port in electrical communication with the controller circuit to receive a signal from a separate machining device.

19. The part separation and cleaning apparatus of claim 1, the controller circuit comprising at least one component selected from the group consisting of a processor, microprocessor, programmable logic controller (PLC), a microcontroller, and an application specific integrated circuit.

20. The part separation and cleaning apparatus of claim 1, wherein the controller circuit tracks a total number of parts received.

21. The part separation and cleaning apparatus of claim 1, further comprising a human-machine interface in electrical communication with the controller circuit.

22. The part separation and cleaning apparatus of claim 1, the liquid holding tub comprising a material selected from the group consisting of stainless steel and a polymeric material.

23. The part separation and cleaning apparatus of claim 1, the indexing plate comprising at least one material selected from the group consisting of a polyamide, a polyvinyl chloride, a polycarbonate, and a polyolefin.

24. The part separation and cleaning apparatus of claim 1, further comprising part collector inserts disposed within the discrete compartments, the part collector inserts comprising a material having a softer durometer value than a durometer value for a material forming the indexing plate.

25. The part separation and cleaning apparatus of claim 1, further comprising one or more ultrasonic transducers mounted to an underside of the liquid holding tub.

26. The part separation and cleaning apparatus of claim 1, wherein the bottom pan of the liquid holding tub is substantially flat.

27. The part separation and cleaning apparatus of claim 1, wherein the bottom pan of the liquid holding tub comprises a conical portion facing downward.

* * * * *